United States Patent [19]

Van Order et al.

[11] Patent Number: 5,061,005
[45] Date of Patent: Oct. 29, 1991

[54] SNAP-IN VISOR MOUNT

[75] Inventors: Kim L. Van Order, Hamilton; Todd A. Zandbergen; Rodger A. Price, both of Holland, all of Mich.

[73] Assignee: Prince Corporation, Holland, Mich.

[21] Appl. No.: 577,330

[22] Filed: Sep. 4, 1990

Related U.S. Application Data

[63] Continuation-in-part of Ser. No. 394,937, Aug. 16, 1989, Pat. No. 4,989,911.

[51] Int. Cl.⁵ ............................................. B60J 3/00
[52] U.S. Cl. ............................................. 296/979
[58] Field of Search ............ 296/97.9; 248/27.3, 248/231.8

[56] References Cited

U.S. PATENT DOCUMENTS

| | | | |
|---|---|---|---|
| 2,687,862 | 8/1954 | Crowther | 248/27.3 |
| 2,884,283 | 4/1959 | Korol et al. | 248/27.3 X |
| 3,131,447 | 5/1964 | Tinnerman | 248/231.8 |
| 3,208,511 | 9/1965 | McAdam | |
| 3,561,068 | 2/1971 | Croxson | 248/27.3 X |
| 4,178,035 | 12/1979 | Czipischirock | 296/97 |
| 4,352,518 | 10/1982 | Prince et al. | 296/97 |
| 4,377,020 | 3/1983 | Vigo | 16/329 |
| 4,529,157 | 7/1985 | Suman et al. | 248/289 |
| 4,553,797 | 11/1985 | Marcus | 339/22 |
| 4,569,552 | 2/1986 | Marks | 296/97 |
| 4,634,196 | 1/1987 | Nestell | 339/5 |
| 4,728,590 | 3/1988 | Adams | 296/97 |
| 4,840,584 | 6/1989 | Cox | 248/27.3 X |
| 4,844,533 | 7/1989 | Dowd et al. | 296/214 |
| 4,893,866 | 1/1990 | Dowd et al. | 296/214 |
| 4,893,867 | 1/1990 | Hilborn et al. | 296/214 |
| 4,902,068 | 2/1990 | Dowd et al. | 296/214 |
| 4,913,484 | 4/1990 | Dowd et al. | 296/97 |

FOREIGN PATENT DOCUMENTS

| | | |
|---|---|---|
| 7415154 | 8/1974 | European Pat. Off. . |
| 2341940 | 6/1978 | European Pat. Off. . |
| 0026283 | 4/1981 | European Pat. Off. ............... 296/97 |
| 916918 | 12/1946 | France ................................ 248/27.3 |
| 2268331 | 11/1975 | France ................................ 248/27.3 |
| 1251479 | 10/1971 | United Kingdom . |

OTHER PUBLICATIONS

Applicant's Exhibit A.

Primary Examiner—Johnny D. Cherry
Assistant Examiner—Gary C. Hoge
Attorney, Agent, or Firm—Price, Heneveld, Cooper, DeWitt & Litton

[57] ABSTRACT

A mounting system for mounting a vehicle headliner and visors to a vehicle includes a spider-like mounting member for each visor and which includes a central hub with alternate sets of legs. A first set of legs extend downwardly from the hub and terminate in mounting bases to which a visor mounting bracket is attached, while a second set of downwardly extending legs terminate in ends which engage and grip the upper surface of the vehicle roof when the mounting member is inserted into an aperture of the vehicle roof to snap-fit the visors and attached headliner to the vehicle roof.

33 Claims, 2 Drawing Sheets

SNAP-IN VISOR MOUNT

CROSS REFERENCE TO RELATED APPLICATIONS

This is a continuation-in-part application of U.S. patent application Ser. No. 07/394,937 filed Aug. 16, 1989 now U.S. Pat. No. 4,989,911 and entitled Mounting Assembly, the disclosure of which is incorporated herein by reference.

BACKGROUND OF THE INVENTION

The present invention pertains to a mounting assembly and particularly one used for attaching the end of a visor pivot rod to a roof of a vehicle.

There exists a variety of manners in which vehicle visors are attached to the roof and/or headliner of a vehicle for subsequent attachment to the roof of a vehicle. Some attachment systems have employed mounting screws which extend through a conventional visor mounting bracket, the headliner and then directly into the sheet metal roof of the vehicle. However, systems are somewhat difficult to install quickly along the vehicle assembly line since they require some skill and dexterity. Thus a snap-in type construction is preferable from an ease and cost of manufacturing standpoint.

Previous efforts have been made to incorporate visors with headliners as a subassembly which is then subsequently snapped into the vehicle roof. The advantages of such construction are well known and include the ease of assembly of the interior headliner of the vehicle with the preassembled accessories mounted thereto. One system has employed a polymeric snap-in visor fastening system in which a polymeric mounting plate having a central split post with a pair of outwardly extending flanges. This plate was positioned on the upper side of a headliner which was sandwiched between the mounting plate and a conventional visor mounting bracket secured to the polymeric plate by screws, thus mounting the visor to the snap-in fastener. The visor and headliner to which they were mounted, snapped into the vehicle using the split post and flanges for holding the assembly within an aperture formed in the vehicle roof. It was discovered that, over a period of time, polymeric fasteners when under constant stress used in such an installation tend to flow or creep which loosens the visor assembly with respect to its mounting to the sheet metal roof of the vehicle. Also during the use of the visor, during which significant forces are focused at the pivot rod mounting location, loosening of the visor occurs.

The utilization of spring steel snap-in fastening systems such as disclosed in U.S. Pat. No. 4,569,552 and in pending U.S. patent application Ser. No. 394,937 filed Aug. 16, 1989 entitled MOUNTING ASSEMBLY overcomes the difficulties of polymeric-type snap-in fasteners. The fastener of the present invention also provides a spring steel snap-in fastener and in one which optimizes the performance of the fastener system and accommodates for different tolerances in vehicle roof mounting locations. Further, the system of the present invention requires only a single sheet of roof material for securely attaching the headliner and visors mounted thereto to the vehicle roof.

SUMMARY OF THE PRESENT INVENTION

The system of the present invention provides an improved snap-in visor rod mounting assembly which can also be used for assisting in holding the headliner in place. The mounting assembly includes a spider-like member with a central hub with a first set of legs terminating an integral base which may be a continuous plate or segmented and which includes apertures for receiving fastening means such as screws for the attachment of a conventional visor rod mounting bracket thereto. Also extending downwardly from the central hub are alternately staggered support legs which extend toward the roof and terminate in ends configured to securely grip the upper surface of the sheet metal roof of a vehicle while the base engages the opposite side to compressibly hold the mounting assembly, the visor and the headliner attached thereto to the sheet metal roof of a vehicle.

In a preferred embodiment of the invention, the mounting member is made of spring steel and the mounting base is defined by three equally spaced segments including locator means thereon for aligning the mounting assembly to the vehicle roof. Further, in a preferred embodiment of the invention, the support legs are terminated in an inclined V-shaped end for providing multiple engagement points for the legs to the edge of the aperture formed in the sheet metal roof of the vehicle and to accommodate for tolerance variations in the mounting aperture. Such construction provides a relatively inexpensive mounting assembly which has maximum ability to securely hold a visor and headliner in position for an extended period of time in a secure fashion and provides ease of installation during assembly.

These and other features, objects and advantages of the present invention, will become apparent upon reading the following description thereof together with reference to the accompanying drawings in which:

DETAILED DESCRIPTION OF THE PREFERRED EMBODIMENT

Figure 1:
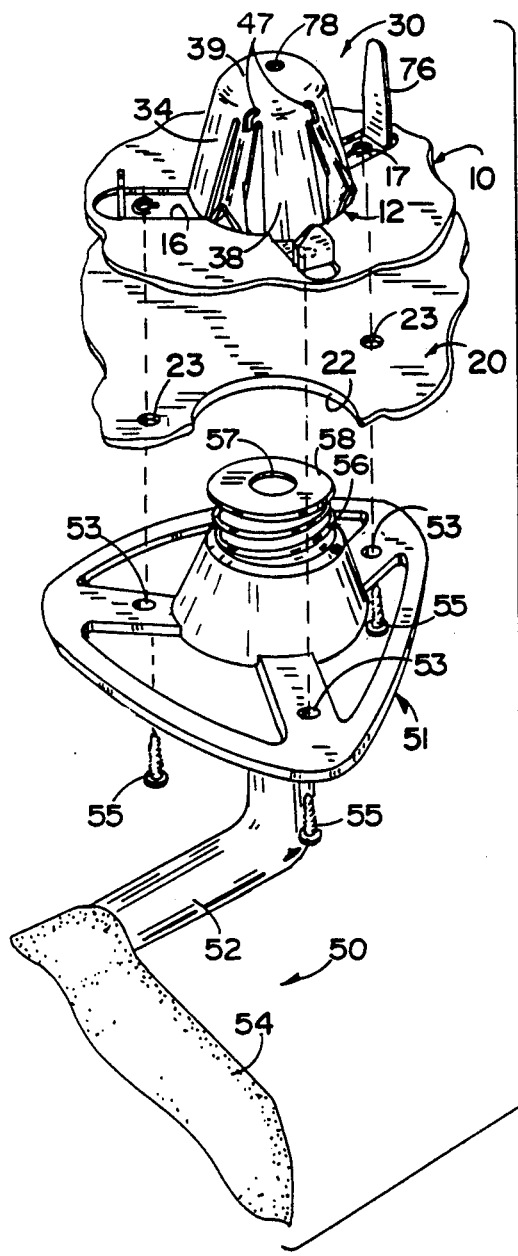
FIG. 1 is a fragmentary exploded perspective view of a vehicle visor, headliner and mounting system and a portion of the sheet metal vehicle roof incorporating the present invention.
Figure 5:
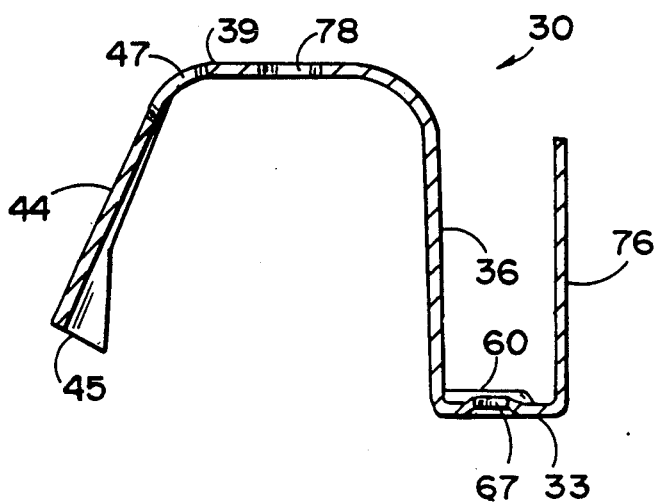
FIG. 5 is a cross-sectional view taken along section line V—V of FIG. 2.
Figure 6:
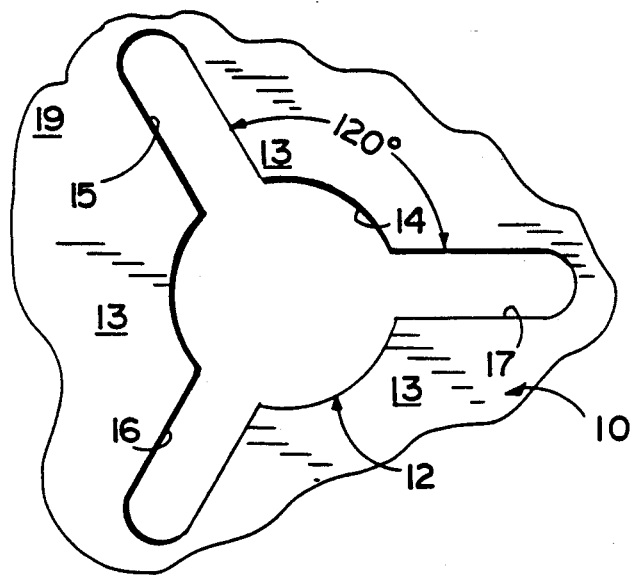
FIG. 6 is a plan view of the aperture formed in the sheet metal roof of the vehicle for receiving the mounting member shown in FIGS. 1-5.

Referring initially to FIG. 1 there is shown a section of a vehicle roof 10 having an aperture 12 formed therein as best seen in FIG. 6. Aperture 12 is configured to lockably receive the mounting member 30 of the present invention which is shown in detail in FIGS. 2-5. The vehicle includes a headliner 20 which can be made of conventional construction and include for example, a molded polymeric or other substrate to which a decorative fabric is integrally attached. Headliner 20 includes an aperture 22 (FIG. 1) for receiving the upwardly extending end of a visor pivot rod mounting bracket assembly 50 including a visor pivot rod 52 to which a vehicle visor 54 is mounted by means of a suitable torque fitting such as disclosed in U.S. Pat. No. 4,500,131. The visor can be of the construction of and may include accessories such as a covered illuminated vanity mirror as disclosed in U.S. Pat. No. 4,227,241.

The visor mounting bracket 50 is of generally conventional construction having a generally triangular configuration with corner apertures 53 which are spaced approximately 120° apart for receiving fastening screws 55 therethrough which extend through apertures 23 in the headliner into the mounting member 30 during preassembly of the visor assembly 50 to the headliner 20 and mounting member 30. It is to be understood that each of the visors in the vehicle include such a mounting arrangement and the mounting member 30 of the present invention may also be employed for mounting other vehicle accessories to the headliner 20 for subsequent snapping into the vehicle roof. The visor pivot rod 52 is mounted to the generally triangular-shaped bracket 51 by means of a conventional compression spring 56 which terminates in a washer 58 conventionally secured to the end 57 of the pivot rod such as by peening or rolling end 57. This holds the visor rod 52 to bracket 51 with a predetermined rotational torque such that the visor rod can pivot with respect to bracket 51 for moving the visor between a forward windshield position and a side window position as desired. This attachment of the visor pivot rod 52 to bracket 51 is conventional.

Figure 7:
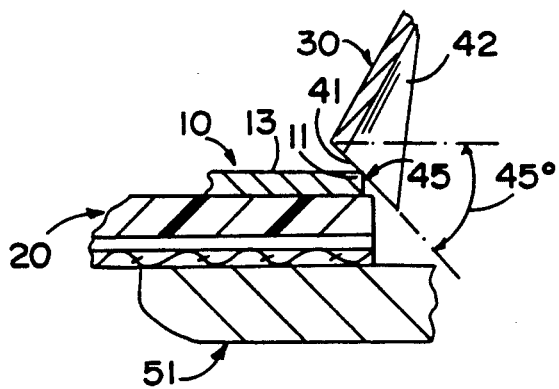
FIG. 7 is an enlarged fragmentary cross-sectional view showing the engagement of one of the legs of the mounting member of the present invention to the vehicle roof.

The aperture 12 of the sheet metal roof 10 of the present invention includes as best seen in FIG. 6 a generally circular portion 14 with three outwardly and equally spaced notches 15, 16 and 17 which extend radially outwardly from the center of circular aperture 14 and are spaced at 120° intervals. The edges of the arcuate sections 13 of sheet metal 10 between notches 15, 16 and 17 are engaged by the mounting member 30 of the present invention as best seen in FIG. 7 and as described below for snap-mounting the member 30, to which visor assembly 50 and headliner 20 is attached, to the sheet metal roof of the vehicle. The sheet metal roof area which includes aperture 12 may be the front header of the vehicle, either of the A-pillars, or other suitable structural member having a single layer of sheet metal sufficiently rigid to support the visors and headliner to which the visor and mounting member 30 are attached. Notches 15, 16 and 17 as described below serve anchor and locating functions for the snap-in fastener 30 as described in greater detail below.

The mounting member 30 is integrally formed of a suitable spring steel material such as 1074 spring steel having a thickness of approximately 1/32 of an inch and is formed in a progressive die, heat treated and finished with anti-oxidation finish, which can be a finishing treatment commonly used in the industry. Member 30 is a spider-like member with a central hub 39 having two sets of alternately staggered first and second downwardly and outwardly extending legs. A first set of legs includes legs 34, 36 and 38 which terminate in a base section 32 which engages the upper surface of the headliner 20 and the lower surface of the sheet metal roof 10 and which is defined by three generally rectangular and equally spaced base segments 31, 33 and 35 integral with legs 34, 36 and 38 respectively. Legs 34, 36 and 38 like associated base segments 31, 33 and 35 are equally spaced in approximately 120° intervals around the periphery of the generally circular base construction so formed. Each of the arcuate legs 34, 36 and 38 in turn circumscribe an arc of approximately 70°. The spider-like member 30 includes a second set of legs 40, 42 and 44 which are support legs and are interlevel with the legs 34, 36 and 38 in an alternately staggered relationship with the ends 45 of legs 40, 42 and 44 engaging the upper surface 19 of sheet metal roof 10 and the support bases or pads of legs 34, 36 and 38 engaging the lower surface of member 10 as best seen in FIGS. 1 and 7. Legs 40, 42 and 44 extend downwardly from hub 39 at equally spaced 120° intervals between legs 34, 36 and 38 and terminate as best seen in FIGS. 4 and 5 a V-shaped inclined end 45 which are inclined inwardly and downwardly as viewed in FIGS. 5 and 7 at an angle of approximately 45° in the preferred embodiment although other angles ranging from 30° to 60° may be employed.

Figure 3:
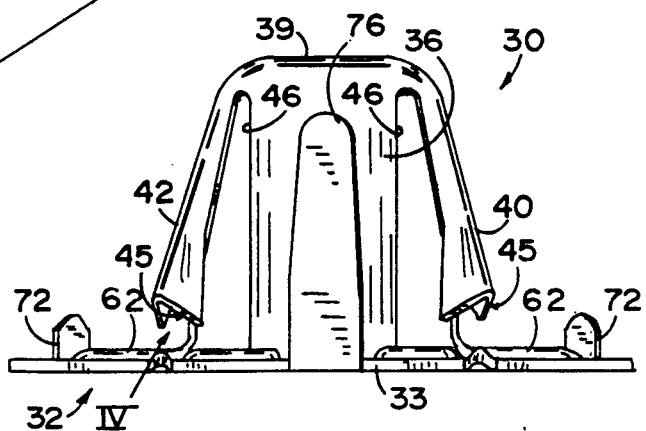
FIG. 3 is an enlarged right side elevational view of a mounting member shown in FIG. 2.
Figure 4:
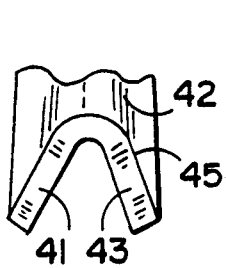
FIG. 4 is an enlarged fragmentary end view of one of the legs of the mounting member shown in FIG. 3 taken in the direction of arrow IV in FIG. 3.

Each of the legs 40, 42 and 44 are formed by slots 46 extending between each of the legs 34, 36 and 38 and are bent in the V-shape as best seen in FIGS. 3 and 4 during the forming process. The utilization of the inverted V-shape as best seen in FIG. 4 provides two linear contact areas 41 and 43 which can engage the edges 13 of the aperture 12 in sheet metal roof 10 at two spaced-apart locations between each of the slots 15, 16 and 17 to maximize the securing of member 30 in a snap-fit fashion within the aperture 12. Further, the bending of the legs 40, 42 and 44 provides additional rigidity and strength to the legs so formed.

At the upper ends of each of the legs where they are integrally joined with the hub 39 of member 30 there is provided an aperture 47 which allows resiliency of each of the legs for the initial installation by insertion through the circular portion 14 of aperture 12. Once they extend through the aperture they spring outwardly into a locking position as best seen in FIGS. 1 and 7 and the slots 47 have no further functional effect.

Each of the base segments 31, 33 and 35 of legs 34, 36 and 38 respectively include raised upper patterned surfaces 60 and 62 formed on opposite ends thereof and which individually include elements which extend in orthogonal directions for providing a cross-shaped linear contact pattern against the lower surface of sheet metal roof 10. The utilization of reference surfaces 60 and 62 facilitate the tolerance control of the mounting of member 30 to the vehicle roof and provide precise control surfaces against which the ends 45 of the spring or support legs 40, 42 and 44 can operate to compressibly engage the sheet metal roof.

Each of the base segments 31, 33 and 35 also include integral thread forming raised apertures 65 centered in the legs and located between reference surfaces 60 and 62 for threadably receiving the fastening screws 55 which secure the visor mounting bracket 51 to the mounting member 30. Apertures 65 are formed by providing a generally circular center aperture with an outwardly extending notch 66 and forming at the periphery of the aperture, an inclined spiral ramp 67 to define an edge of the support reference plate which curves upwardly to define a thread-like aperture for receiving the fastening screws 55.

Extending outwardly and parallel to the longitudinal axis of base mounting segments 31 and 35 are anti-rotation tabs 70 and 72 respectively, which include upstanding curved tips as best seen in FIG. 3 which extend from an arm portion 71 and 75 respectively of the anti-rotation tabs. Arms 71 and 75 are defined by slots 73 in the sheet metal forming member 30 during its forming process. By providing the spring arms, which fit within slots 15 and 16 of aperture 12 as best seen in FIG. 1, once installed, the support member 30 and the visor and headliner attached thereto is prevented from rotation. The utilization of the elongated arm 71 and 75 facilitate installation of the member by providing some adjustable movement in connection also with the curved upper ends 72 for tolerance variations.

Base segment 33 includes an upwardly and inwardly inclined locator tab 76 which extends upwardly through slot 17 of aperture 12 in sheet metal roof support 10 as best seen in FIG. 1. To initially assist in aligning the support member 30 within the aperture 12 as the headliner and visors attached thereto are installed in a vehicle. To assist in the die cutting and progressive stamping of the product, a tooling index aperture 78 is formed at the center of the hub 39 for providing a locating and indexing means for the part in the tool.

Figure 2:
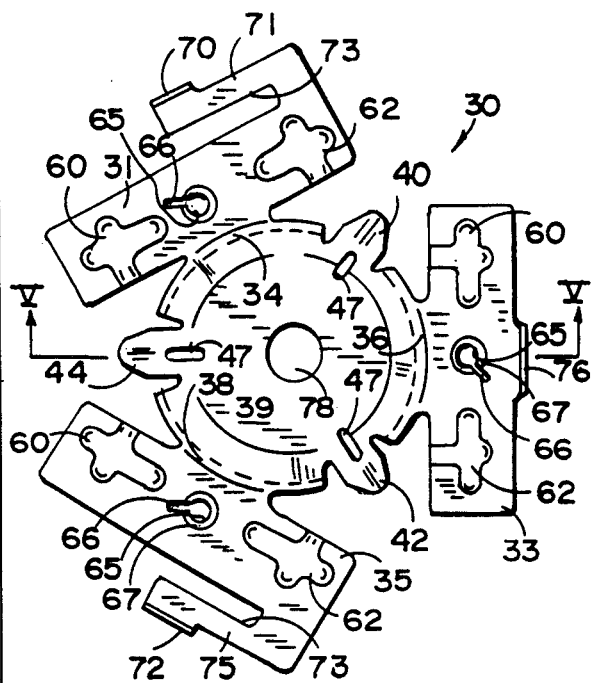
FIG. 2 is an enlarged top plan view of the mounting member of the present invention.

The mounting member 30 in the present invention is utilized in connection with, in the preferred embodiment, a pair of visor assemblies and is initially placed in alignment over each of the visor apertures 22 in the headliner 20 at the top surface thereof. Slots 15, 16 and 17 naturally are aligned with apertures 23 formed in the headliner. Typically, tab 76 will be positioned on the outboard corner of the headliner as illustrated in FIG. 1. Each of the visor assemblies 50 are then aligned with the mounting member 30 and headliner 20 and fastening screws 55 driven through the triangular mounting bracket 50 and threadably received in the apertures 65 in the segmented mounting base members 31, 33 and 35. This secures the visor to the headliner holding the headliner 20 in compression between the mounting member 30 and the visor bracket 50. Each visor is so installed to the headliner which then can be inserted in a car during assembly in a conventional manner as through the windshield opening and snap-fitted into the sheet metal 10 of the vehicle by an upward pushing force or suitable impact. During insertion, each of the legs 40, 42 and 44, assisted by slots 47, deflect inwardly with their outer edges engaging the arcuate edges of sheet metal lands 13 until the tips 45 clear the upper surface 19 of the sheet metal roof 10 whereupon the legs spring outwardly into a locking position as illustrated in FIGS. 1 and 7. In this position, the inclined surfaces 41 and 43 of the V-shaped ends 45 engage the upper corner 11 of the edges 13 as best seen in FIG. 7 to lock the mounting member 30, visor and headliner attached thereto in compressive engagement with the sheet metal roof 10. In this position, the upper surfaces and particularly the reference surfaces 60 and 62 engage the lower surface of the sheet metal roof in the areas adjacent to and on opposite sides of apertures 15, 16 and 17 as best seen in FIGS. 1 and 2 which provide a counteractive force through the connection of upwardly extending legs 34, 36 and 38 to the base segments.

With the mounting member construction of the present invention therefore, a snap-in spring steel fastener is provided for permanently and securely fastening visors to a headliner and snap-fitting the same into a vehicle roof to accommodate various tolerances for the vehicle roof. The unique spider-like spring leg construction provides six upper contact locations at equally spaced intervals around the periphery of an aperture formed in the sheet metal roof and the segmented support base engages the lower surface at six interspersed reference surfaces vehicle roof. The support base also includes means for locating the support member in the vehicle roof and preventing its rotation once installed as well as threaded apertures for receiving the visor mounting screws. Such a system allows the easy snap-in assembly of the visors and headliners during installation of a vehicle, and yet allows the conventional removal of the visors utilizing the fastening screws without disturbing the secure mounting of the mounting member 30 to the roof. This allows a visor to be removed for repair or installation of a new visor without disturbing the mounting member 30.

It will become apparent to those skilled in the art the various modifications to the preferred embodiment of the invention described herein can be made without departing from the spirit or scope thereof defined by the appended claims.

The embodiments of the invention in which an exclusive property or privelege is claimed are defined as follows:

1. A mounting member for the snap-in mounting of a vehicle visor within an aperture formed in the roof of a vehicle comprising:
 a spider-like member having a center hub and a plurality of alternately staggered legs extending downwardly and outwardly from said hub and in which first ones of said legs each terminate in a mounting base for engagement with a lower side of a vehicle roof wherein said mounting base at the end of each of said first legs include aperture means for receiving fasteners for attaching a visor bracket to said mounting member, and second ones of said legs terminate in ends which grip the upper side of a vehicle roof.

2. The apparatus as defined in claim 1 wherein said ends of said second legs are inclined to engage an edge of a vehicle roof at an angle.

3. The apparatus as defined in claim 2 wherein said ends of said second legs are generally V-shaped to provide multiple contact points with the edge of the vehicle roof.

4. The apparatus as defined in claim 3 wherein said spider-like member is integrally formed of spring steel.

5. The apparatus as defined in claim 4 wherein said V-shaped ends of said second legs are formed by bending said ends of said legs.

6. A mounting member for the snap-in mounting of a vehicle visor within an aperture formed in the roof of a vehicle comprising:
 a spider-like member integrally formed of spring steel and having a center hub and a plurality of alternately staggered legs extending downwardly and outwardly from said hub and in which first ones of said legs each terminate in a mounting base for engagement with a lower side of a vehicle roof and second ones of said legs terminate in ends which grip the upper side of a vehicle roof, wherein said ends of said second legs are generally V-shaped to provide multiple contact points with the edge of the vehicle roof and are inclined to engage an edge of a vehicle roof at an angle, wherein said mounting base at the end of each of said first legs include aperture means for receiving fasteners for attaching a visor bracket to said mounting member.

7. The apparatus as defined in claim 6 wherein said mounting base of each of said first legs includes a raised reference surface for accurately positioning said mounting member against the vehicle roof.

8. The apparatus as defined in claim 7 wherein at least one of said mounting bases includes an upwardly extending indexing tab for locating said mounting member with respect to an aperture in the vehicle roof.

9. The apparatus as defined in claim 8 wherein said aperture formed in each of said mounting bases includes a radially extending slot and an inclined peripheral edge to define a threaded aperture.

10. The apparatus as defined in claim 9 wherein each of said mounting bases is generally rectangular with said aperture centrally located therein and wherein each of said mounting bases include a pair of reference surfaces positioned on either side of said aperture.

11. The apparatus as defined in claim 10 wherein said ends of said second legs are inclined at an angle of from about 30° to about 60° to provide contact positions which vary to accomodate tolerance variations in the vehicle roof.

12. A mounting member for the snap-in mounting of a vehicle visor within an aperture in the roof structure of a vehicle comprising:
   base member means for engaging the lower side of a vehicle roof and having a plurality of upwardly extending legs terminating in a central hub; and
   a plurality of locking legs extending downwardly and outwardly from said hub and having ends extending in vertically spaced relationship to said base member means for engagement with the upper side of a vehicle roof member for compressively holding the roof member between said locking legs and said base member means, said base member means including means for attaching a visor mounting bracket thereto, wherein said locking legs are elastically deformable such that a visor secured to said mounting bracket can be snap-fitted to the vehicle roof, wherein the junction of said locking legs with said central hub includes slots to increase the resilience of said legs for ease of insertion into the aperture in the vehicle roof.

13. The apparatus as defined in claim 12 wherein said base member means comprises a plurality of segments with each segment integrally attached to the end of an upwardly extending leg.

14. A mounting member for the snap-in mounting of a vehicle visor within an aperture in the roof structure of a vehicle comprising:
   base member means for engaging the lower side of a vehicle roof and having a plurality of upwardly extending legs terminating in a central hub; and
   a plurality of locking legs extending downwardly and outwardly from said hub and having ends extending in vertically spaced relationship to said base member means for engagement with the upper side of a vehicle roof member for compressively holding the roof member between said locking legs and said base member means, said base member means including means for attaching a visor mounting bracket thereto, wherein said locking legs are elastically deformable such that a visor secured to said mounting bracket can be snap-fitted to the vehicle roof, wherein said base member means comprises a plurality of segments with each segment integrally attached to the end of an upwardly extending leg, and wherein the junction of said locking legs with said central hub includes slots to increase the resilience of said legs for ease of insertion into the aperture in the vehicle roof.

15. The apparatus as defined in claim 14 wherein said locking legs include ends remote from said central hub which are inclined to engage an edge of the aperture in the vehicle roof at an angle.

16. The apparatus as defined in claim 15 wherein said ends of said locking legs are generally V-shaped to provide multiple contact points with the edge of the aperture in the vehicle roof.

17. The apparatus as defined in claim 16 wherein said mounting member is integrally formed of spring steel.

18. The apparatus as defined in claim 17 wherein said means for mounting a visor bracket to said segments of said base member means comprises an aperture formed in each of said segments.

19. The apparatus as defined in claim 18 wherein said aperture formed in each of said segments include a radially extending slot and an inclined peripheral edge to define a threaded aperture.

20. The apparatus as defined in claim 19 wherein each of said segments include an upwardly formed reference surface for positioning said base member with respect to the lower side of the vehicle roof.

21. The apparatus as defined in claim 20 wherein at least one of said segments includes an upwardly extending indexing tab for locating said mounting member with respect to the aperture in the vehicle roof.

22. A mounting system for the snap-in mounting of a vehicle headliner with one or more visors, said system including a mounting member for securing the system within apertures in the vehicle roof comprising:
   a headliner having an upper and a lower surface with said upper surface adapted to face the roof of a vehicle;
   at least one visor having a mounting bracket and fastener means for mounting said bracket to the mounting member;
   a spider-like mounting member having a center hub and a plurality of alternately staggered legs extending downwardly and outwardly from said hub, wherein first ones of said legs each terminate in a mounting base which engages the upper side of said headliner and which includes means for receiving said fastener means of said visor mounting bracket such that said visor can be preassembled to said headliner, and second ones of said legs terminate in ends which engage and grip an upper side of a vehicle roof when said mounting member is inserted into an aperture in the vehicle roof.

23. The apparatus as defined in claim 22 wherein said ends of said second legs are inclined to engage an edge of a vehicle roof at an angle.

24. The apparatus as defined in claim 23 wherein said ends of said second legs are generally V-shaped to provide multiple contact points with the edge of the vehicle roof.

25. The apparatus as defined in claim 24 wherein said spider-like member is integrally formed of spring steel.

26. The apparatus as defined in claim 25 wherein said V-shaped ends of said second legs are formed by bending said ends of said second legs.

27. A mounting system for the snap-in mounting of a vehicle headliner with one or more visors, said system including a mounting member for securing the system within apertures in the vehicle roof comprising:

a headliner having an upper and a lower surface with said upper surface adapted to face the roof of a vehicle;

at least one visor having a mounting bracket and fastener means for mounting said bracket to the mounting member;

a spider-like mounting member integrally formed of spring steel and having a center hub and a plurality of alternately staggered legs extending downwardly and outwardly from said hub, wherein first ones of said legs each terminate in a mounting base which engages the upper side of said headliner and which includes means for receiving said fastener means of said visor mounting bracket such that said visor can be preassembled to said headliner, the second ones of said legs terminate in ends which engage and grip an upper side of a vehicle roof when said mounting member is inserted into an aperture in the vehicle roof wherein said ends of said second legs are generally V-shaped to provide multiple contact points with the edge of the vehicle roof are inclined to engage an edge of a vehicle roof at an angle, wherein said V-shaped ends of said second legs are formed by bending said ends of said second legs, and wherein said means for receiving said fastening means comprises aperture means formed in each of said mounting bases for attaching said visor mounting bracket and visor to said headliner with said mounting member on a side of said headliner opposite said visor.

28. The apparatus as defined in claim 27 wherein said mounting base of each of said first legs includes a raised reference surface for accurately positioning said mounting member against the vehicle roof.

29. The apparatus as defined in claim 28 wherein at least one of said mounting bases includes an upwardly extending indexing tab for locating said mounting member with respect to an aperture in the vehicle roof.

30. The apparatus as defined in claim 29 wherein each of said mounting bases is generally rectangular with said aperture centrally located therein and wherein each of said mounting bases include a pair of reference surfaces positioned of either side of said aperture.

31. The apparatus as defined in claim 30 wherein said ends of said second legs are inclined at an angle of from about 30° to about 60° to provide contact positions which vary to accomodate tolerance variations in the vehicle roof.

32. The apparatus as defined in claim 31 wherein the junction of said second legs with said hub includes slots formed therein to increase the flexibility of said second legs to provide easier insertion into the aperture in the vehicle roof.

33. A mounting member for the snap-in mounting of a vehicle visor within an aperture formed in the roof of a vehicle comprising:

a spider-like mounting member integrally formed of spring steel and having a center hub and a plurality of alternately staggered legs extending downwardly and outwardly from said hub, and in which first ones of said legs each terminate in a mounting base for engagement with a lower side of a vehicle roof and second ones of said legs terminate in V-shaped ends formed by bending said ends to grip spaced-apart contact points at the edge of the aperture and on the upper side of a vehicle roof; and means for mounting a visor to said spider-like member.

* * * * *

UNITED STATES PATENT AND TRADEMARK OFFICE
CERTIFICATE OF CORRECTION

PATENT NO. : 5,061,005

DATED : October 29, 1991

INVENTOR(S) : Kim L. Van Order et al.

It is certified that error appears in the above-identified patent and that said Letters Patent is hereby corrected as shown below:

Column 4, line 8:
"interlevel" should be --integral--;

Column 10, line 23:
Delete "mounting".

Signed and Sealed this

Fifteenth Day of June, 1993

Attest:

Attesting Officer

MICHAEL K. KIRK

Acting Commissioner of Patents and Trademarks